April 2, 1963   G. B. AMERY   3,084,332
SEISMIC DATA PRESENTATION METHOD AND SYSTEM
Filed Nov. 2, 1959
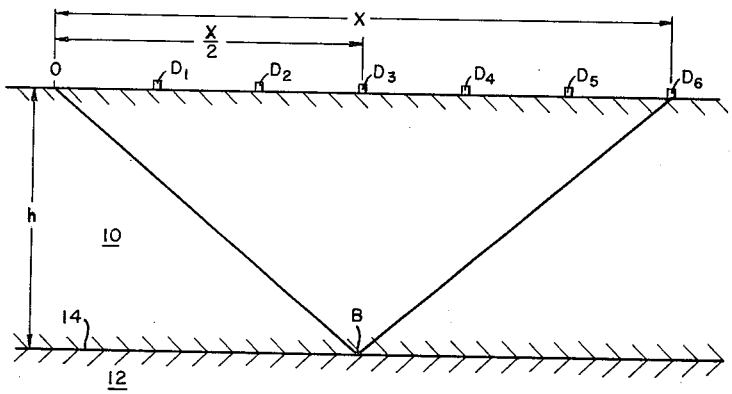
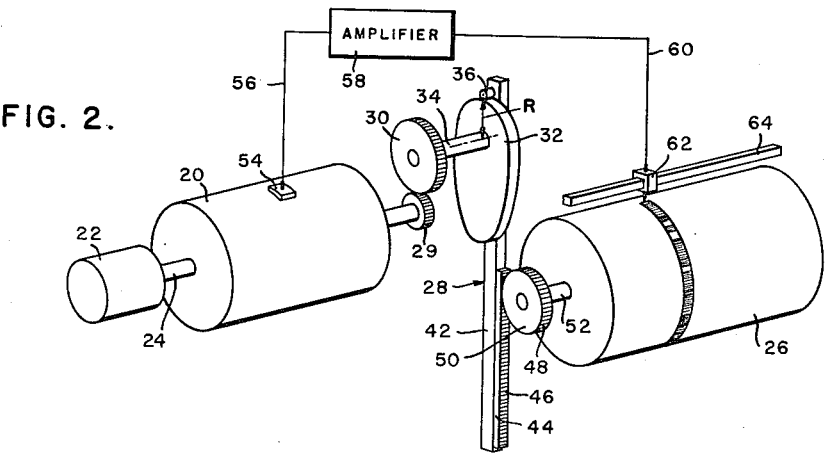
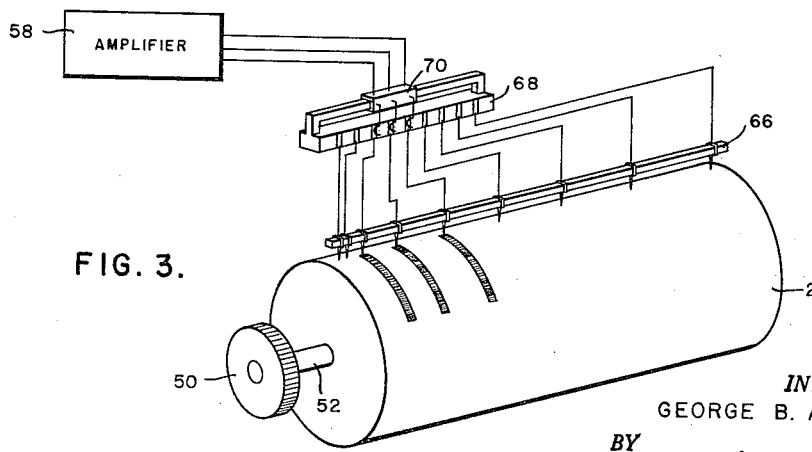
INVENTOR.
GEORGE B. AMERY,
BY Frank S. Troidl
ATTORNEY.

United States Patent Office 3,084,332
Patented Apr. 2, 1963

3,084,332
SEISMIC DATA PRESENTATION METHOD AND SYSTEM
George B. Amery, Anchorage, Alaska, assignor, by mesne assignments, to Jersey Production Research Company, Tulsa, Okla., a corporation of Delaware
Filed Nov. 2, 1959, Ser. No. 850,397
5 Claims. (Cl. 340—15.5)

This invention relates to seismic prospecting. More particularly, this invention relates to a method of presenting reflection seismograph data obtained by detecting seismic waves at points spaced from the origin of the seismic waves.

Information concerning the geology of an area and the physical characteristics of the different subsurface formations in that area are often useful in determining the probability of oil-containing formations being in the area. One bit of useful information is the velocity of seismic waves through the various subsurface formations. The velocity through a formation may be obtained by use of a seismic prospecting technique called the reflection technique.

In seismic reflection prospecting, seismic waves are generated from an origin. These waves may be generated by various means well known in the art, such as an explosion of dynamite or the dropping of a heavy weight on the surface of the earth. The generated seismic waves penetrate through the subsurface formations. Some of the energy of these waves is reflected as they impinge upon a subsurface boundary separating two subsurface formations, which have different physical characteristics. The reflected seismic waves are subsequently detected by detectors, such as seismometers, located in spaced-apart relation on the surface of the earth.

Upon detection of the seismic information by the detectors, an electric signal is generated from the detectors, corresponding to the wave motion of the detected seismic waves. These electric signals are recorded on various types of recording means, such as a magnetic drum.

Because of the restrictions on normal presentation of seismic data, the events recorded on the recording means are usually linear with respect to the distance $x$ of the seismometers from the origin of the seismic waves. Also, each of the events on the traces is usually linearly related with respect to the time $t$ it takes the seismic waves to be generated from the source of the seismic waves, reflected by the subsurface boundary separating two subsurface strata, and returned to the surface of the earth and detected.

However, the velocity of seismic waves $V$ through a subsurface formation and the depth $h$ of the reflecting boundary below the surface of the earth closely follow the equation $$t^2 = \frac{x^2}{V^2} + \frac{4h^2}{V^2}$$

so that $x^2$ plotted versus $t^2$ results in a straight line which has a slope equal to $1/V^2$ and an intercept on the ordinate axis equal to $4h^2/V^2$, from which $V$ and $h$ may be straightway obtained. A current practice is for the human computer to "pick" the linear $x$ and linear $t$ records. The data are then mathematically squared and manually plotted on $x^2$ versus $t^2$ graphs. Obviously, this is very time consuming.

My new method for presenting reflection seismograph data presents the data in a proper form, that is, with an $x^2$ and $t^2$ relationship. This eliminates all of the time-consuming human computations and plottings.

In practicing my new method of presenting reflection seismograph data, the traces which have been recorded on a first recording means by the normal recording methods are reproduced as corresponding electrical signals. The electrical signals are then conducted to a second recording means. The electrical signals are recorded on the second recording means as a plurality of traces with each trace being spaced in one direction from a point on the second recording means representing the origin of the seismic waves, a distance proportional to the square of the distance of each of said detecting points from the origin of the seismic waves. The time, $t$, of each event on each trace is spaced in a second direction from the point representing the origin of the seismic waves, a distance proportional to the square of the time interval from the time of initiation of the seismic waves to the time of detection of each event.

Various systems for practicing my new method are disclosed herein. My new systems include a second movable recording means upon which electrical signals obtained from the traces recorded on the first recording means are to be presented in usable form. Mechanical means are provided to interconnect the two recording means and for moving the second recording means in one direction at a rate proportional to the square of the rate of movement of the first recording means. Means are provided for reproducing the traces on the first movable recording means as corresponding electrical signals. Means are also provided for recording each of the electrical signals on the second movable recording means. The traces recorded on the second movable recording means are in a direction perpendicular to the direction of movement of the second recording means and spaced from a point on the second recording means representing the origin of the seismic waves. The spacing of each of the traces on the second recording means from the point representing the origin of the seismic waves is proportional to the square of the distance of the detecting point for each respective trace from the origin of the seismic waves. Thus, the presentation of seismic data in accordance with my invention provides the art with a presentation having a linear $x^2$ and $t^2$ relationship. From this, the direct obtainment of the velocity of the seismic waves through a subsurface formation and the depth of the subsurface reflecting boundary below the surface of the earth can be easily ascertained.

A further understanding of the invention as well as its many advantages may be had by reference to the following detailed description and drawings in which:

FIG. 1 represents a subsurface section consisting of two horizontal strata and useful in explaining my invention;

FIG. 2 is a schematic diagram illustrating one embodiment of my invention; and

FIG. 3 is a schematic diagram showing a second embodiment of means for recording the traces upon the second recording drum.

Referring specifically to FIG. 1, subsurface formations 10 and 12 having different physical characteristics are shown. Boundary 14 between subsurface formations 10 and 12 thus reflects some of the energy generated from the origin O. These waves are generated through the subsurface formation 10, reflected by the reflecting boundary 14 and sequentially detected by detectors $D_1$ through $D_6$.

From the geometry of FIG. 1 it is seen that the distance from the point O to a point of reflection B is:

$$OB = \sqrt{\left(\frac{x}{2}\right)^2 + h^2} = \sqrt{\frac{x^2}{4} + h^2} = \sqrt{\frac{x^2 + 4h^2}{4}} = \frac{1}{2}\sqrt{x^2 + 4h^2}$$

where:

$x$ = the distance of detector $D_6$ from the origin O, and $h$ = the depth of the reflecting boundary 14 from the surface of the earth.

The total travel distance of the reflection is $OB+BD_6$. Therefore, $$OB+BD_6 = \sqrt{x^2+4h^2}$$

Since the distance $OB+BD_6$ is also equal to $tV$, we find that $$t = \sqrt{\frac{x^2+4h^2}{V}}$$

where:

$t$ = travel time, and
$V$ = the velocity through the subsurface formation 10.

The above equation can be written in the form:

$$t^2 = \frac{x^2}{v^2} + \frac{4h^2}{v^2}$$

If $x^2$ is plotted versus $t^2$, the resultant is a straight line, which equation is of the general form:

$$y = mx + b$$

so long as reasonable limits of $x$ are observed. In this equation, $$m = \frac{1}{V^2} \text{ and } b = \frac{4h^2}{V^2}$$

$V$ and $h$ may then be determined.

However, as stated above, the usual method of presenting seismic data is to present the data on a linear $x$ and linear $t$ scale. Hence, the human computer must take the $x$ and $t$ records, square the data, and manually plot the $x^2$, $t^2$ graphs.

My new method and a system for carrying out the method provide the art with a means for automatically plotting the seismic records with $x^2$ as a function of $t^2$. This is illustrated in FIG. 2.

Referring specifically to FIG. 2, a first rotatable drum 20 is shown operated by a motor 22 connected to the magnetic drum 20 by means of a rotatable shaft 24.

A second rotatable drum 26 is shown upon which the reflection seismograph data on the first rotatable drum 20 is to be recorded with the desired $x^2$ and $t^2$ relationship.

Mechanical means indicated generally by the numeral 28 interconnects the drum 20 and the recording drum 26. The mechanical interconnecting means 28 is built so that when the first drum 20 has an angular displacement $\theta$ from the zero position, the recording drum 26 will have an angular displacement proportional to $\theta^2$ from the zero position. The shaft 24 passing through the drum 20 is connected to a gear 29. Gear 29 meshes with a second gear 30 which is attached to a cam 32 by means of an interconnecting shaft 34.

The outer edge of cam 32 is in continual contact with a rider 36. The rider 36 is mounted on the upper end of a rack support 42.

Mounted on the elongated rack support 42 is the rack member 44 including a plurality of teeth 46.

The teeth 46 on rack 44 engage the teeth 48 of a pinion gear 50. The pinion gear 50 is connected to the shaft 52 of the rotatable recording drum 26.

Thus, it can be seen that the recording drum 26 is rotated when the drum 20 is rotated. The rate at which the recording drum 26 is rotated is dependent upon the configuration of the periphery of the cam 32. The periphery of cam 32 is formed to fit to the equation $\rho = R + S\theta^2$, where $\rho$ is the radius of the cam for angular displacement $\theta$ from a reference point, $R$ is the radius at $\theta = 0$, and $S$ is chosen to give a transcribed record of suitable or convenient length. Using a cam the periphery of which fits the above formula, the angular displacement from the zero position of the recording drum 26 is proportional to the square of the angular displacement from the zero position of the magnetic drum 20. A portion of the cam ahead of the reference point is constructed with a constant radius $R$. The purpose of this is to permit the magnetic drum 20 to attain its normal operating speed before it produces through the interconnecting mechanism 28 the force necessary to accelerate recording drum 26.

The rack 44 is designed with such a length that at the maximum travel of the cam, rack 44 disengages from pinion gear 50, thereby allowing the recording drum 26 to be stopped independent of the interconnecting means 28.

The traces recorded on the drum 20 are preferably magnetized traces providing magnetized sections proportional to the amplitude of the corresponding detected seismic waves. A magnetic head 54 is shown schematically as being mounted adjacent the periphery of the magnetic drum 20. The magnetic head 54 picks up the magnetism on the magnetic drum 20 and produces corresponding electrical signals. These electrical signals are conducted through lead 56 to an amplifier 58. The amplified signals from amplifier 58 are conducted through leads 60 to a recording head 62.

The recording head 62 may be one of various types. However, I prefer to use a recording head which records the traces on the recording drum 26 in the form of "variable density" traces. Variable density traces are provided by using an electrosensitive paper on the recording drum 6. The density of the traces on the recording drum 26 is thus proportional to the voltage developed through the electrosensitive paper by recording head 62. This voltage is proportional to the amplitudes of the signals fed to the recording head 62 which in turn is proportional to the magnetism on the magnetic drum 20. The recording head 62 is slidably mounted upon a slide member 64. Slide member 64 is calibrated for $x^2$.

In operating the system shown in FIG. 2, the magnetic drum 20 is rotated to a position such that the magnetic head 54 is far enough behind the zero position as to allow motor 22 to develop its normal operating angular velocity $\omega$ before the zero position is reached. The recording drum 26 is positioned so that the recording head 62 rests on the zero position of the recording drum 26. The rider 36 then rests on the cam 32 at a point just ahead of the reference point.

Motor 22 is then started, bringing magnetic drum 20 to its normal rate of rotation $\omega$ before the zero position is reached. When drum 20 reaches the zero position, it applies a force through the interconnecting means 28 which gives the recording drum 26 an angular velocity proportional to $2\omega^2 t$. Thus, when magnetic drum 20 passes through an angle from zero position of $\omega t$, the recording drum 26 is displaced from zero position an angle proportional to $\omega^2 t^2$. Each of the seismic events recorded on magnetic drum 20 will occur at a time proportional to the time interval from the initiation of the seismic waves from point O to the detection of the events at detector D. Therefore, these events will be recorded on the variable density recording drum at a time proportional to the square of $t$. Thus, a graph is automatically plotted which is a plot of $x^2$ versus $t^2$. After the first trace is plotted on variable density recording drum 26, the slidable recording head 62 is then moved to a second position along the slide 64 which is calibrated for $x^2$ and the same procedure followed for each of the traces, $D_2$ through $D_6$.

The 2:1 reduction gear relationship of gears 29 and 30 allows the use of one-half of the cam 32 to provide the acceleration of variable density recording drum 26 for recording the traces on drum 26, leaving the other half for returning the system to the zero position.

The embodiment of FIG. 3 provides a means for recording a plurality of traces at one time. In FIG. 3 there is shown a recording head mounting means 66 in which are mounted a plurality of recording heads. As shown, the recording points are spaced longitudinally according to $x^2$. A plurality of fixed contacts corresponding to the number of recording heads are mounted on a fixed contact mounting means 68.

Three movable contacts are mounted within a movable contact mounting means 70. The movable contacts are connected to leads from an amplifier such as amplifier 58. Using the system shown in FIG. 3, three traces can be recorded at a time. Of course, if desirable any number of traces may be recorded at one time. With a more complicated system, all of the traces on the magnetic drum 20 can be recorded simultaneously on the variable density recording drum 26.

It is to be understood that various modifications can be made in practicing my new method using my new apparatus without departing from the scope of the appended claims.

I claim:

1. A method of presenting reflection seismograph data obtained by detecting seismic waves at points spaced different distances from the origin of said waves and recorded on a first recording means as a plurality of traces comprising the steps of: reproducing each of said traces as corresponding electrical signals; conducting the electrical signals to a second recording means; and recording the electrical signals on the second recording means as a plurality of traces, with each trace being spaced in one direction from a point on said second recording means representing the origin of said seismic waves a distance proportional to the square of the distance of each of said detecting points from the origin of the seismic waves, and the time of each event on each trace being spaced in a second direction from said point on the second recording means a distance proportional to the square of the time interval from the time of initiation of seismic waves from the origin to the time of detection of each event.

2. A method in accordance with claim 1 wherein the plurality of traces recorded on the second recording means are recorded sequentially.

3. A method in accordance with claim 1 wherein the plurality of traces recorded on the second recording means are recorded more than one at a time.

4. A system for presenting reflection seismograph data obtained by detecting seismic waves at points spaced different distances from the origin of said waves and recorded on a first movable recording means as a plurality of traces comprising: a second movable recording means; mechanical means interconnecting the first and second recording means for displacing the second recording means in one direction from the zero position an amount proportional to the square of the amount of displacement from the zero position of the first recording means; means operatively associated with the first movable recording means and second movable recording means for reproducing the traces on the first movable recording means as corresponding electrical signals and recording each of the electrical signals on the second movable recording means as a trace spaced from a point on the second recording means representing the origin of said seismic waves a distance in a direction perpendicular to the direction of movement of the second recording means proportional to the square of the distance of the detecting point from the origin of the seismic waves.

5. A system for presenting reflection seismograph data obtained by detecting seismic waves at points spaced different distances from the origin of said waves and recorded on a first rotatable drum as a plurality of traces comprising: a second rotatable drum; a cam operated by rotation of the first rotatable drum, the periphery of said cam being fitted to the equation $\rho = R + S\theta^2$, where $\rho$ is the radius of the cam for angular displacement $\theta$ from a reference point, R is the radius when $\theta$ is zero and S chosen to give proper length of transcription; an elongated rack operated by said cam; a pinion connected to a shaft extending through the axis of the second rotatable drum and rotated by movement of the rack so that the displacement from a zero position of the second rotatable drum is proportional to the square of the displacement from a zero position of the first rotatable drum; means operatively associated with the first rotatable drum and the second rotatable drum for reproducing the traces on the first rotatable drum as corresponding electrical signals and for recording each of the electrical signals on the second rotatable drum as a trace spaced longitudinally a distance proportional to the square of the distance of the detecting point from the origin of the seismic waves from a point on the second recording means representing the origin of said seismic waves.

References Cited in the file of this patent

UNITED STATES PATENTS

| Re. 24,330 | Hawkins | June 18, 1957 |
| 2,485,200 | Imm | Oct. 18, 1949 |
| 2,713,147 | Stripling | July 12, 1955 |
| 2,752,092 | McDonal | June 26, 1956 |
| 2,933,243 | Luck | Apr. 19, 1960 |

OTHER REFERENCES

Publication, "Product Engineering," November 1949, pp. 123–124.